US006863879B2

(12) United States Patent
Rojey et al.

(10) Patent No.: US 6,863,879 B2
(45) Date of Patent: Mar. 8, 2005

(54) INSTALLATION AND PROCESS FOR THE PRODUCTION OF SYNTHESIS GAS COMPRISING A REACTOR FOR STEAM REFORMING AND A REACTOR FOR CONVERTING $CO_2$ HEATED BY A HOT GAS

(75) Inventors: Alexandre Rojey, Rueil-Malmaison (FR); Ari Minkkinen, Saint Nom la Breteche (FR); Reynald Bonneau, Villeurbanne (FR)

(73) Assignee: Institut Francais DuPetrole, Rueil-Malmaison (FR)

( * ) Notice: Subject to any disclaimer, the term of this patent is extended or adjusted under 35 U.S.C. 154(b) by 216 days.

(21) Appl. No.: 10/172,751

(22) Filed: Jun. 17, 2002

(65) Prior Publication Data
US 2003/0014974 A1 Jan. 23, 2003

(30) Foreign Application Priority Data
Jun. 15, 2001 (FR) .............................. 01 08071

(51) Int. Cl.$^7$ .............................. C01B 3/26; F01K 25/00
(52) U.S. Cl. .......................... 423/651; 60/670; 60/671; 252/373; 422/190; 422/201; 422/211
(58) Field of Search ................... 60/670, 671; 252/373; 422/190, 201, 211, 21; 423/651

(56) References Cited
U.S. PATENT DOCUMENTS
3,859,230 A * 1/1975 Moe .......................... 252/373

| 4,182,746 A | 1/1980 | Myint |
| 5,714,657 A | 2/1998 | deVries |
| 6,223,519 B1 * | 5/2001 | Basu et al. ............. 60/783 |

FOREIGN PATENT DOCUMENTS

| EP | 0291857 | 11/1988 |
| EP | 0737647 | 10/1996 |
| WO | 00/58242 | 10/2000 |

OTHER PUBLICATIONS

Patent Abstracts of Japan, Publication No. 2000233918, Publication Date Aug. 29, 2000, Applicant—Mitsui Eng & Shipbuild Co. Ltd. Title—Productiion of Carbon Monoxide.
Patent Abstracts of Japan, Publication No. 06211502, Publication Date Feb. 8, 1994, Applicant—Cosmo Eng KK, Title—Production of Carbon Monoxide and Hydrogen.

* cited by examiner

*Primary Examiner*—Stanley S. Silverman
*Assistant Examiner*—Maribel Medina
(74) *Attorney, Agent, or Firm*—Millen, White, Zelano, Branigan, P.C.

(57) ABSTRACT

Installation for the production of synthesis gas from a hydrocarbon feedstock comprising at least one reactor for steam reforming, at least one reactor for converting $CO_2$ that is equipped with at least one feed means by the effluent that is obtained from the steam reforming and at least one other feed means by a gas comprising carbon dioxide, characterized in that at least one reactor for steam reforming or for converting $CO_2$ is heated by a hot gas.

28 Claims, 1 Drawing Sheet

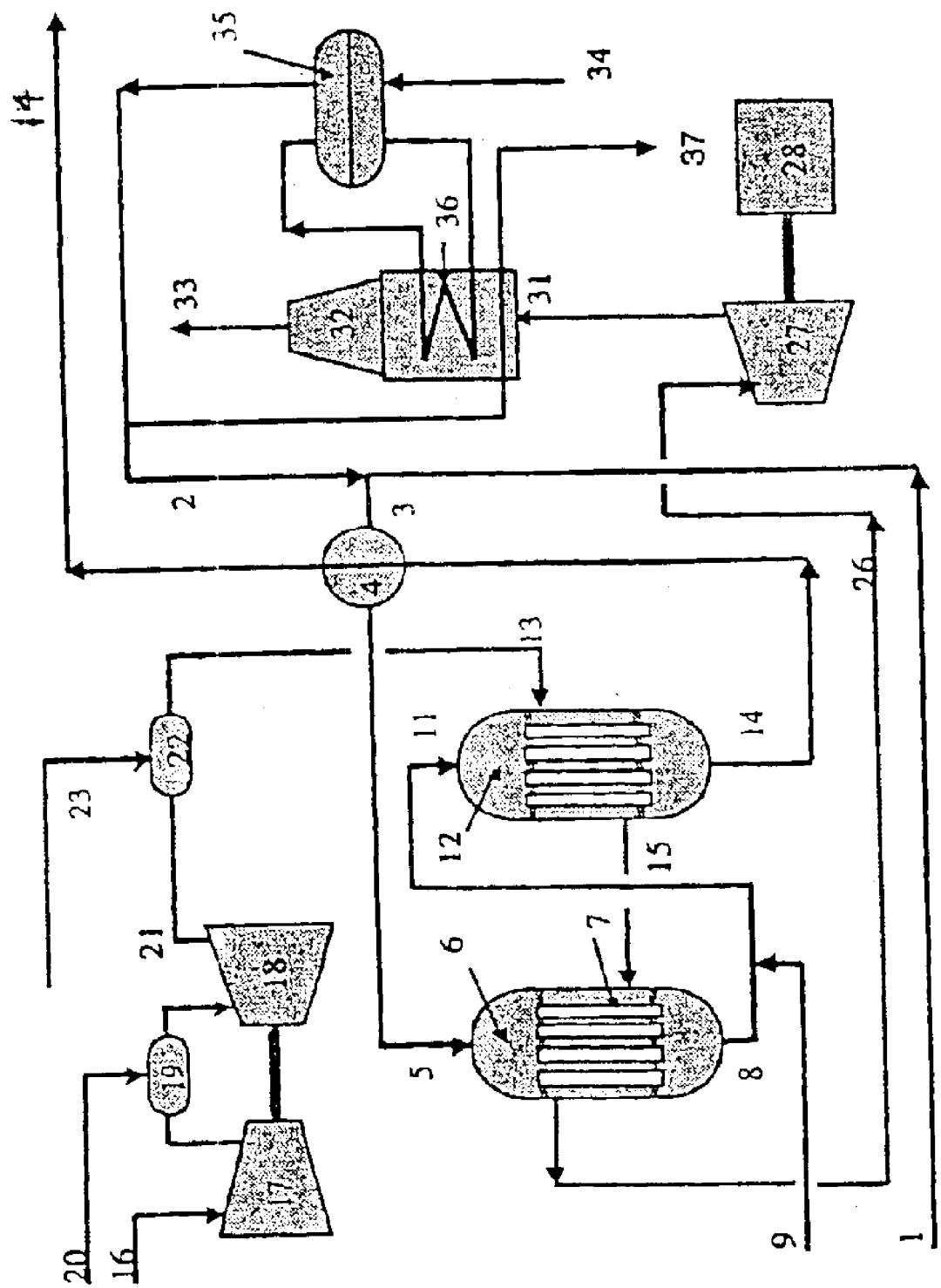

INSTALLATION AND PROCESS FOR THE PRODUCTION OF SYNTHESIS GAS COMPRISING A REACTOR FOR STEAM REFORMING AND A REACTOR FOR CONVERTING $CO_2$ HEATED BY A HOT GAS

This invention relates to an installation and a process for the production of synthesis gas comprising steam reforming, $CO_2$ conversion and optionally turbo-compression.

PRIOR ART

The conversion of natural gas into liquid products is economically advantageous in particular in isolated geographic areas of industrialized countries that lack infrastructure, such as, for example, power plants or a petrochemical industry. It makes it possible to upgrade natural gas by transforming it into chemical products that can be transported at low cost.

The transport of natural gas by gas pipeline and the gas liquefaction plants represent significant investments and are often less profitable economically than the chemical conversion of gas into liquids.

Among the liquids that are easily synthesized from natural gas are in particular methanol and paraffinic hydrocarbons that are obtained by Fischer-Tropsch synthesis and converted into gas oil and high-grade kerosene in a hydrocracking-isomerizing unit, for example according to Patent FR 2 789 691.

The production of methanol or dimethyl ether requires a synthesis gas that comprises carbon monoxide, carbon dioxide and hydrogen. This synthesis gas advantageously offers an $H_2/2CO+3CO_2$ molar ratio of between 0.4 and 10, more preferably between 0.5 and 4.

The production of about 7000 to 10,000 barrels of gas oil per day (or about 1100 to 1600 m³ per day) by means of the Fischer-Tropsch synthesis requires about 1.6 to 2.2 $10^6$ Nm³/day of natural gas (or about 60 to 85 MMSCFD). This natural gas essentially contains methane that is converted in a first step into a synthesis gas that essentially contains hydrogen ($H_2$), carbon monoxide (CO), as well as carbon dioxide ($CO_2$) in the smallest proportion. Actually, the $CO_2$ does not act like a reagent in the Fischer-Tropsch synthesis, whereas it is converted in the synthesis reaction of methanol.

The synthesis gas that is best suited to the Fischer-Tropsch synthesis should exhibit an $H_2/CO$ molar ratio that is close to 2. Obtaining such a ratio is possible by partial oxidation of the natural gas (POX) as reaction R1 indicates:

$$CH_4 + \tfrac{1}{2}O_2 \; CO + 2H_2 \quad (R1)$$

This method for producing synthesis gas is, however, very expensive and energy-intensive. In conventional partial oxidation processes, the air is fractionated to eliminate the nitrogen that is an inert gas. This separation requires very large volumes of air that should be compressed and liquefied. In addition, the use of conventional equipment (compressors, heat exchangers, boilers with gas burners) brings about very high investment levels and ineffective use of energy.

The synthesis gas CO, $H_2$ can also be produced by combining an exothermic partial oxidation stage, according to reaction R1, with an endothermic steam reforming stage:

$$CH_4 + H_2O \; CO + 3H_2 \quad (R2)$$

The two operations can be brought together in the same reactor that is generally called an autothermal reactor.

The output of the Fischer-Tropsch process is generally about 65% (35% of the natural gas is consumed for the requirements of the unit). This can be reflected by significant $CO_2$ emissions on the order of 1.5 tons per ton of Fischer-Tropsch gas oil that is produced.

It is therefore important to reduce this autoconsumption as well as the $CO_2$ emissions. Thus, in the search for a solution that provides a better performance, two factors should be taken into account:

The production of pure oxygen for the partial oxidation stage requires a very large investment.

The production of liquid fuels from natural gas by chemical conversion produces relatively large amounts of $CO_2$ that advantageously can be at least partially recycled.

A possibility for recycling $CO_2$ consists in recycling $CO_2$ at the inlet of the steam reforming stage. A portion of the $CO_2$ can be converted according to the reaction:

$$CH_4 + CO_2 \rightarrow 2CO + 2H_2$$

The possibility of operating a partial recycling is recognized. This recycling, however, comes up against certain limitations, in particular the necessity for not producing coke.

This coke production is promoted by a relatively low hydrogen content and a relatively low temperature, conditions that are brought together in the vicinity of the inlet to the steam reforming reactor.

Another important use of the synthesis gas is the production of ammonia from a synthesis gas that contains nitrogen. In this case, the synthesis gas is prepared from air without separating the oxygen and the nitrogen; it therefore contains a large proportion of nitrogen in addition to CO, $CO_2$ and $H_2$.

Furthermore, it is also possible to produce hydrogen from natural gas, for example by reforming with natural gas and steam to obtain a hydrogen-rich synthesis gas, then to carry out the separation of the hydrogen with, for example, a PSA (Pressure Swing Absorption)-type absorption unit, i.e., a unit for absorption by pressure variation.

Patent Application WO 93/06041 describes a process for enriching air with oxygen. In this application, various options for preparing oxygen-nitrogen mixtures that contain more oxygen than air are described. In particular, a separation technique that makes it possible to obtain enriched air that uses a separation by membrane or a P.S.A.-type absorption, combined with a gas turbine that provides the necessary air as feedstock of the separation section, is claimed.

The use of purge gases as gas turbine fuel is also described. The enriched air is preferably used in a reforming unit of a carbon source such as natural gas so as to obtain the synthesis gas.

Patent Applications WO 97/33847 and WO 97/48639 describe a process for the production of synthesis gas in which the synthesis gas production unit is placed between the compression section and the section that comprises the expansion turbine of a gas turbine. An additional compressor is placed after the synthesis gas production unit and before the unit that uses this synthesis gas to convert it into methanol or dimethyl ether or hydrocarbons, via the Fischer-Tropsch synthesis. In the WO 97/48639 application, it is specified that the synthesis gas production is ensured by an autothermal reforming unit, also called ATR (autothermal reforming).

Patent Application EP 212 755 describes a process for the production of synthesis gas by hydrocarbon steam reforming in which a heat exchange is carried out between the reagent gases and combustion gases in the reaction zone, whereby said combustion gases are at least partially recycled to the combustion zone. Furthermore, said process can also comprise an expansion zone and a compressor that can be brought together with the combustion zone to constitute a gas turbine.

Patent Application FR-A-2 316 730 describes a process for the production of synthesis gas from natural gas and air or oxygen that is diluted by a cover gas that comprises at least one compressor that is driven by a power turbine.

Patent GB-B-2 168 718 describes a process for the production of synthesis gas in which the hydrocarbons of the feedstock are converted into carbon oxides (CO, $CO_2$) and the gas that is thus obtained is mixed with recycled $CO_2$ and then sent into a reactor for converting $CO_2$ into CO (Reverse Water Gas Shift Reaction: RWGS. The effluent that is obtained from this second unit is optionally sent to a system for separating $CO_2$, then said $CO_2$ is reheated and recycled at the outlet of the steam former. This patent does not specify the nature of the reactors that are used. In particular, no heating means of the reactor in which the $CO_2$ is converted into CO is described. In addition, no diagram for integrating these reactors for reforming or converting $CO_2$ is shown. Further, this patent does not suggest the use of turbo-compression systems.

SUMMARY OF THE INVENTION

This invention relates to an installation and a process for the production of synthesis gas, for example for the Fischer-Tropsch synthesis of liquid hydrocarbons but also for any other process that requires the prior production of synthesis gas. The feedstock of the process according to the invention can be any type of hydrocarbon feedstock that makes it possible to prepare synthesis gas, for example from natural gas.

This invention consists in adjusting the $H_2/CO$ ratio in the gas mixture that is sent to another stage that is located downstream, for example the Fischer-Tropsch synthesis, by bringing or by recycling $CO_2$ to a section for producing synthesis gas in two stages comprising a steam reforming according to reaction R2 and a section for converting $CO_2$ to produce CO in the presence of hydrogen according to reaction R3 (RWGS or Reverse Water Gas Shift reaction according to English terminology) below:

$$CO_2 + H_2 \; CO + H_2O \quad\quad\quad (R3)$$

This invention further comprises a heating system that is particularly advantageous for carrying out these two stages for production of synthesis gas. In the process according to the invention, at least one stage among the stages for steam reforming and converting $CO_2$ (RWGS) is preferably carried out in at least one exchange reactor (for example a multi-tubular reactor, preferably two multitubular reactors that are placed in series); more preferably this reactor is particularly compact. At least one of said reactors thus can be heated by a hot gas, preferably the two reactors when they are both of exchanger reactor type. This hot gas is preferably pressurized to be able to increase the circulation speed and thus to reduce the reactor section. This pressurized hot gas can be generated in particular with turbo-compression units such as those that equip a gas turbine, i.e., an expansion turbine that is coupled to at least one compression stage and a combustion chamber.

The installation according to the invention is therefore an installation for the production of synthesis gas from a hydrocarbon feedstock that comprises at least one steam reforming reactor, at least one reactor for converting $CO_2$ that is equipped with at least one feed means by the effluent that is obtained from steam reforming and at least one other feed means by a gas that comprises carbon dioxide, characterized in that at least one reactor for steam reforming or converting $CO_2$ is heated by a hot gas.

The invention also relates to a process for the production of synthesis gas from a hydrocarbon feedstock, preferably of natural gas, using the installation according to the invention.

BRIEF DESCRIPTION OF THE DRAWINGS

FIG. 1 illustrates an installation in accordance with the invention comprises at least one reforming reactor, at least one reactor for converting $CO_2$ equipped with at least one feed means for introducing the effluent obtained from reforming reactor and at least one other feed means by for introducing carbon dioxide, in which the reactor for reforming or and the reactor for converting $CO_2$ are heated by a hot gas.

DETAILED DESCRIPTION OF THE INVENTION

This invention relates to an installation and a process for the production of synthesis gas, for example for the Fischer-Tropsch synthesis of liquid hydrocarbons but also for any other process that requires the previous production of synthesis gas such as the synthesis of methanol or C1–C6 alcohols, for example. The feedstock of the process according to the invention can be any type of hydrocarbon feedstock that makes it possible to prepare synthesis gas, preferably natural gas or an associated gas or a petroleum naphtha. The process according to the invention makes it possible to avoid the preliminary stage for separating the oxygen and the nitrogen that are contained in the air or the use of air that is not separated with the drawbacks that result from the presence of nitrogen that dilutes reagents.

At relatively high temperature (800 to 1000° C.), reaction (R3) for converting $CO_2$ (RWGS), which is endothermic, can be carried out. At a relatively low temperature, the inverse reaction of converting CO in the presence of water is thermodynamically promoted and usually practiced so as to increase the $H_2/CO$ ratio.

It is therefore particularly important to keep the temperature at a high level so as to promote the conversion of $CO_2$ and at the same time to avoid the formation of coke.

The conditions under which the reaction for converting $CO_2$ (R3) is carried out are favorable; actually, the presence of excess hydrogen, as well as the fact of operating at a relatively high temperature level reduce the risks of a coke deposit.

Different advantages result from this: The possibility of reducing the carbon dioxide emissions, the increase of the final production of liquid products for a set amount of natural gas, and the possibility of avoiding the installation of an oxygen production unit.

The necessity for installing a partial oxidation unit that is combined with steam reforming, as is generally proposed upstream from a unit for synthesis of methanol or Fischer-Tropsch synthesis, is also avoided. The steam reforming unit also makes it possible to produce the hydrogen that is necessary for the hydrocracking stage from a fraction of the synthesis gas that is produced.

Implementation Conditions

The two stages for steam reforming and converting $CO_2$ are preferably carried out in exchanger reactors, more preferably multitubular reactors, in which a catalyst is placed in a fixed bed. The catalyst that is used for the first steam reforming stage is generally a nickel-based catalyst, deposited on alumina. The gas circulates in the reactor tubes at a pressure of, for example, between 1 and 5 MPa, preferably between 2 and 4 MPa, and it is heated to a temperature of between, for example, 750 and 1000° C., preferably between 800 and 950° C., more preferably between 820 and 940° C. Different types of furnaces can be used: vertical furnaces with hearth burners, furnaces with ground burners, furnaces with lateral heating and terrace furnaces. A recent development consists in reducing the volume of the installations by using pressurized hot gases that can circulate at a relatively high speed.

The second stage for converting $CO_2$ (RWGS) is carried out under similar temperature and pressure conditions, whereby the pressure can be, for example, between 0.5 and 5 MPa, preferably between 1 and 4 MPa, and the temperature at the outlet of the reactor of between 750 and 1100° C., preferably between 800 and 1150° C., more preferably between 850 and 1100° C. The catalyst that is used is, for example, a catalyst based on metal oxides remaining stable under these temperature and pressure conditions. It may be, for example, a catalyst based on iron oxide or chromium oxide, but other catalysts can be considered. The reactor in which this stage for converting $CO_2$ (RWGS) is carried out can be operated at a VVH of, for example, between 300 and 3000 $h^{-1}$.

By operating under these conditions, it is possible to adjust the $H_2/CO$ ratio to a value that is close to the desired value (for example about 2.1 for the Fischer-Tropsch synthesis), while limiting the contents of unconverted methane and carbon oxide.

The carbon dioxide that is used during this second stage can be at least in part formed from recycled carbon dioxide, which makes it possible to limit the emissions of carbon dioxide of the conversion chain. It may be obtained, at least in part, from a carbon dioxide-rich gaseous fraction that is obtained from another conversion unit or another process. It can also be separated from the purge gas that is obtained at the outlet of the Fischer-Tropsch synthesis stage and optionally purified. It can also be obtained at least in part from a carbon-dioxide-rich gaseous fraction that is separated from the gas that is used for heating steam reforming stages and for converting $CO_2$. It can also be obtained from natural gas, when the latter is relatively rich in carbon dioxide. A portion of this carbon dioxide can also be sent to the inlet of the steam reforming stage.

It is important to maintain a sufficiently high temperature during the second stage. The reactor should therefore be heated, which can be carried out by using a hot gas, produced during a combustion stage.

It is advantageous to carry out these two stages in two exchanger reactors, such as, for example, multitubular reactors, that are placed in a series and that can be particularly compact (i.e. that have a relatively large tube density per square meter of reaction section) if they are heated by a pressurized hot gas. The feed pressure of this heating gas is preferably between 0.3 and 1 MPa. Said hot gas can be obtained from any unit for the production of hot gas that is available on the site (for example pressurized steam). A preferred method of this invention, however, consists in generating such a pressurized hot gas that is used to feed the exchanger portion of the exchanger reactors, preferably with a turbo-compression unit such as those that equip the industrial gas turbines. The hot gas that is thus produced, containing about at least 15% by volume of oxygen, preferably about 16 to 17% of oxygen, is available at a pressure that is higher than the atmospheric pressure, generally on the order of about 0.3 to 0.5 MPa and at a temperature that is generally higher than 500° C., preferably from about 600 to 800° C. Taking into account its oxygen content, it can optionally be sent to a post-combustion stage in the presence of an addition of fuel gas to obtain the temperature levels required for heating the two reactors.

According to a preferred embodiment, at the end of these heating stages, the gas that is still warm used for the heat exchange and that exits from the exchanger portion of the last exchanger reactor optionally can be sent into an expansion turbine, for example of the type of those that are used to recover the expansion energy of the FCC gases. Finally, at the end of this expansion stage, the gas that is still hot optionally can be sent to a recovery boiler. The steam that is thus generated can be used at least in part to feed the steam reforming stage.

An example of installation according to the invention is presented in the FIGURE. The operation of the process for generating synthesis gas is described in reference to the diagram of this FIGURE.

The natural gas, previously desulfurized, arrives via pipe (1). It is mixed with the water steam that arrives via pipe (2), and the resulting mixture is sent via pipe (3) to the tubes-calender heat exchanger (4) in which it is preheated by heat exchange with effluent (14) of reactor (12) in which the $CO_2$ conversion reaction is carried out.

The steam reforming stage is carried out in reactor (6) while the $CO_2$ conversion reaction is carried out in reactor (12) that is fed by effluent (8) of reactor (6) after mixing with a suitable $CO_2$-rich flow (9). Each of these reactors can be heated with a furnace that operates according to one of the usual configurations already mentioned. It is advantageous, however, to use a pressurized hot gas. Exchanger reactors (6) and (12) are then equipped in their upper section with a distribution system that makes it possible to introduce the feedstock into a large number of tubes, generally on the order of 30 to 250 tubes per square meter of reactor section. Each tube is filled to the same level with a reforming catalyst (reactor 6) or CO2 conversion catalyst (reactor 12). The calender side of the exchanger reactor is equipped with baffles that are known to one skilled in the art so as to ensure a good distribution of hot gas. Reactor (12) is an exchanger reactor of the same type as reactor (6) but may have a different diameter and tube density.

The diagram of the FIGURE illustrates the method of generating this hot gas. The atmospheric air that arrives via pipe (16) is compressed in compression stages (17) that are entrained by expansion turbine (18) coupled to the compression stages via the drive shaft. The compressed air at the outlet of the compression section is sent to combustion chamber (19) in which fuel gas, which can consist either of a natural gas fraction that arrives in the unit or of a purge gas of the unit, also arrives via pipe (20). The hot gases that exit from combustion chamber (19) are sent to turbine (18) and expanded. The gases that are still hot and pressurized that are obtained from this turbine are sent via pipe (21) to post-combustion chamber (22).

The post-combustion is carried out in the presence of a combustible gas fraction that arrives via pipe (23). The resulting temperature of the hot gases is adjusted by varying the amount of combustible gas to a level of between, for example, 1000 and 1300° C., making it possible to reach the required temperature during the $CO_2$ conversion stage (RWGS). The hot and pressurized gases that exit from post-combustion stage (22) are therefore sent via pipe (13) into reactor (12) from where they emerge via pipe (15).

The gases that are still hot and pressurized and that leave reactor (12) are sent into reactor (6) via pipe (15). The gases that are still hot and pressurized that leave reactor (6) via pipe (26) can be expanded in an expansion turbine that drives an electric generator (28). The gases that exit from expansion turbine (27) can be used to generate steam in recovery boiler (32). The recovery boiler is fed by water via pipe (34). The water circulates in the heating bundles of boiler (36), the saturated steam emerges in pressurized flask (35) and arrives via pipe (2) to be mixed with the natural gas that arrives via pipe (1). Another portion of the steam that is not used in reforming is superheated and exits via pipe (37).

In summary, the invention relates to an installation for production of synthesis gas from a hydrocarbon feedstock comprising at least one steam reforming reactor, at least one reactor for converting $CO_2$ that is equipped with at least one means for feeding by the effluent that is obtained from steam reforming and at least one other means for feeding by a gas that comprises carbon dioxide, characterized in that at least one reactor for steam reforming or for converting $CO_2$ is heated by a hot gas.

The installation according to the invention preferably comprises a reactor for steam reforming and a reactor for converting $CO_2$ that are heated by a hot gas. More preferably, the hot gas that is used to heat said reactor or reactors reaches a pressure of between 0.3 and 1 MPa.

According to an embodiment of the invention, the installation of said hot gas is obtained from an expansion turbine that is coupled to at least one stage for compression and to a combustion chamber.

The installation according to the invention preferably comprises in addition at least one expansion turbine, and more preferably said expansion turbine drives an electric generator.

The installation according to the invention preferably also comprises a boiler used to produce the steam that is necessary to the steam reforming reactor and that is fed by the gases obtained from said expansion turbine.

According to another preferred embodiment of the installation according to the invention, the reactors for steam reforming and for converting $CO_2$ are compact exchanger reactors.

The gas that comprises carbon dioxide is preferably obtained from a recycling of the effluent that is obtained from the $CO_2$ conversion reactor. It can also be obtained from a natural source of $CO_2$ or from another process that generates $CO_2$. It can also optionally be obtained at least in part from $CO_2$ that is separated and recycled at the outlet of a stage for producing synthesis gas.

The invention also relates to a process for the production of synthesis gas from a hydrocarbon feedstock using the installation according to the invention.

In the process according to the invention, the pressurized hot gas that is used to feed the exchanger portion of the exchanger reactors is preferably generated with the turbo-compression unit that comprises an expansion turbine coupled to at least one compression stage and to a combustion chamber. More preferably, the gas that is used for the heat exchange and that exits from the exchanger portion of the last exchanger reactor is sent into an expansion turbine.

The hydrocarbon feedstock of the process according to the invention is very preferably a natural gas, and even more preferably, the synthesis gas that is produced is used in a Fischer-Tropsch synthesis unit. The gas that comprises the $CO_2$ that feeds the reactor for converting $CO_2$ optionally can be separated at the outlet of a Fischer-Tropsch synthesis unit.

EXAMPLE

The following example will be described in connection with FIG. 1. Sent via pipe (1) is 17.7 t/h of a natural gas whose molar composition is as follows:

| | |
|---|---|
| $C_1$ | 0.89 |
| $C_2$ | 0.07 |
| $C_3$ | 0.02 |
| $C_4$ | 0.01 |
| $C_{5+}$ | 0.01 |

19.5 t/h of water steam is introduced via pipe (2). The gas mixture that is obtained is heated to a temperature of 650° C. in exchanger (4). In reactor (6), the temperature of the gas mixture is brought up to 880° C. The gas mixture that is obtained and that represents a mass flow rate of 37.2 t/h is mixed with a flow rate of 13.6 t/h of $CO_2$ that arrives via pipe (9). In this example, the gas mixture that exits from reactor (6) is sent directly to reactor (12) from where it emerges with a mass flow rate of 50.8 t/h at a temperature of 900° C. The molar composition of the gas mixture that is obtained is as follows:

| | |
|---|---|
| $C_1$ | 0.09 |
| CO | 0.27 |
| $CO_2$ | 0.08 |
| $H_2$ | 0.56 |

It is observed that it is thus possible to bring the $H_2$/CO ratio to a value of 2.07, close to the desired value of 2.1.

The thermal power that is necessary during the first stage is close to 36 Gcal/h (42 MW) and the thermal power that is necessary during the second stage is close to 10 Gcal/h (12 MW).

To obtain the thermal power of 46 Gcal/h (54 MW) in a single pass, the pressurized hot gas that is obtained from post-combustion chamber (22) is used at a temperature of 1200° C., a pressure of 0.4 MPa absolute and a flow rate of 341 t/h. This gas is introduced in series through the second and then the first reactor, i.e., reactors (12) and (6) respectively.

This pressurized hot gas is cooled in co-current in reactor (12) to 1150° C. and enters the calender of first reactor (6) via line (15). It is then cooled in counter-current by the effluent that is obtained from the steam reforming. This hot gas exits from the first reactor at 700° C. and about 0.3 MPa and is expanded through a power turbine (27) that makes it possible to recover 18.5 MW of mechanical power while releasing the hot gas at 535° C. and about 0.12 MPa absolute. This makes it possible to generate about 18 MW of electric power for exportation.

The hot gas at 535° C. is cooled to 250° C. before being released into the atmosphere, while also releasing 25 Gcal/h (29 MW) of heat to generate 38 t/h of steam at 3.5 MPa; this 38 t/h of steam comprises 19.5 t/h of saturated steam that is used for steam reforming and 18.5 t/h of steam that is superheated to 500° C. that is exported.

The total amount of energy consumed in the form of burnt combustible gas to produce the required amount of hot gas at 1200° C. and 0.4 MPa absolute at the outlet of the post-combustion chamber is 104 Gcal/h (120 MW).

A gas generator that is obtained from a Frame 5-type gas turbine that operates at 75% of the maximum load is used to draw in 331 t/h of air at 20° C., compressed at 4 MPa with axial compressor (17), and to send it into combustion chamber (19) into which is added 5.5 t/h of pressurized combustible gas that has a gross calorific value of 10 556 Kcal/kg to bring the temperature at the outlet of the combustion chamber to 1200° C. before power turbine (18) that drives the axial compressor.

The gas exits from the power turbine at 0.4 MPa absolute and 680° C. via flow (21) and is sent to post-combustion chamber (22) or an additional flow in the form of a combustion gas under low pressure (23) of 4.5 t/h and of the same specific heat is admitted so as to bring the temperature of hot gas (13) to the value of 1200° C. that is required by the reaction.

The overall energy output of the process is calculated below:

|  | Gcal/h | MW |
|---|---|---|
| Burnt combustible gas | | |
| Gas generator (GE/LM 5000) | 57.2 | 66.0 |
| Post-combustion | 46.8 | 54.0 |
| Total | 104.0 | 120.0 |
| Energy provided | | |
| Reaction heat | 46.0 | 54.0 |
| Generation of electricity | 15.5 | 18.0 |
| Heat transmitted with steam | 25.0 | 29.0 |
| Total | 86.5 | 101.0 |
| Overall Energy Output | 86.5/104 = 0.831 | or 83%. |

The preceding examples can be repeated with similar success by substituting the generically or specifically described reactants and/or operating conditions of this invention for those used in the preceding examples.

The entire disclosure of all applications, patents and publications, cited above and below, and of corresponding French Application No. 01/08.071, filed Jun. 15, 2001.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An installation for the production of synthesis gas from a hydrocarbon feedstock, said installation comprising;
at least one reactor for steam reforming,
at least one reactor for converting $CO_2$ which is equipped with at least one means for feeding effluent obtained from the at least one steam reforming reactor and at least one other means for feeding a gas that comprises carbon dioxide,
means for providing a pressurized heat exchange gas at a pressure of between 0.3 and 1 MPa comprising at least one compression stage for compressing atmospheric air, a first combustion chamber for combusting fuel gas with said atmospheric air, a first expansion turbine for expanding gas from said combustion chamber, and a second combustion chamber for heating gas from said first expansion turbine to produce said pressurized heat exchange gas,
means for heating said at least one reactor for steam reforming or said at least one reactor for converting $CO_2$ with said pressurized heat exchange gas, or both, and
means for passing said pressurized heat exchange gas from said expansion turbine to said means for heating.

2. An installation according to claim 1, wherein said means for heating heats said at least one reactor for steam reforming and said at least one reactor for converting $CO_2$ with said pressurized heat exchange gas.

3. An installation according to claim 2, further comprising a second expansion turbine for expanding said heat exchange from the last of said reactors.

4. An installation according to claim 3, further comprising an electric generator driven by said second expansion turbine.

5. An installation according to claim 4, further comprising a boiler for producing steam, said boiler being in communication with the at least one steam reforming reactor, and means for introducing gases obtained from said second expansion turbine into the boiler.

6. An installation according to claim 2, further comprising a second expansion turbine for expanding said heat exchange from the last of said reactors.

7. An installation according to claim 6, further comprising an electric generator driven by said second expansion turbine.

8. An installation according to claim 7, further comprising a boiler for producing steam, said boiler being in communication with the at least one steam reforming reactor, and means for introducing gases obtained from said second expansion turbine into the boiler.

9. An installation according to claim 1, wherein the reactors for steam reforming and for converting $CO_2$ are compact exchanger reactors.

10. An installation according to claim 1, further comprising means for recycling at least a portion of the effluent obtained from the at least one reactor for converting $CO_2$, to said at least one reactor for converting $CO_2$.

11. An installation according to claim 1, further comprising a natural source of $CO_2$ or another $CO_2$-generating process connected to said at least one reactor for converting $CO_2$.

12. An installation according to claim 1, further comprising a Fischer-Tropsch synthesis unit, means for separating $CO_2$ at the outlet of said means Fischer-Tropsch synthesis unit, and means for delivering $CO_2$ from said means for separating $CO_2$ to said at least one reactor for converting $CO_2$.

13. An installation according to claim 1, wherein said reactors are multitubular reactors, in which a catalyst is placed in a fixed bed.

14. An installation according to claim 1, wherein said reactors are multitubular reactors, in which a catalyst is placed in a fixed bed, and said reactors comprise means for heating the tubes of said reactors are by said heat exchange gas.

15. An installation according to claim 1, wherein said means for heating heats said at least one reactor for steam reforming.

16. An installation according to claim 1, wherein said at least one reactor for steam reforming is operated at a temperature of 700–1000° C., said at least one reactor for converting $CO_2$ is operated at a temperature of 750–1100° C., and said second combustion chamber heats the gas from said first expansion turbine to a temperature of 1000–1300° C.

17. A process for the production of synthesis gas from a hydrocarbon feedstock comprising operating the installation according to claim 1.

18. A process according to claim 17, wherein the feedstock circulates in the reactor tubes of said at least one reactor for converting $CO_2$ at a pressure of between 0.5 and 5 MPa and at a temperature at the outlet of the reactor of between 750 and 1100° C.

19. A process according to claim 17, wherein the reactors for steam reforming and for converting $CO_2$ are compact exchanger reactors having heat exchange portions, and the pressurized heat exchange gas is used to feed the exchanger portions of the exchanger reactors.

20. A process according to claim 19, wherein the gas exiting from the exchanger portions of the last exchanger reactor is sent to a second expansion turbine.

21. A process according to claim 20, wherein the hydrocarbon feedstock is a natural gas.

22. A process according to claim 21, wherein the synthesis gas is used in a Fischer-Tropsch synthesis unit.

23. A process according to claim 22, wherein gas that comprises $CO_2$ which is feed into the $CO_2$ conversion reactor is separated at the outlet of said Fischer-Tropsch synthesis unit.

24. A process according to claim 17, wherein said at least one reactor for steam reforming is operated at a temperature of 700–1000° C., said at least one reactor for converting $CO_2$ is operated at a temperature of 750–1100° C., and said second combustion chamber heats the gas from said first expansion turbine to a temperature of 1000–1300° C.

25. A process according to claim 17, wherein said reactors are multitubular reactors, in which a catalyst is placed in a fixed bed.

26. A process according to claim 17, wherein the feedstock circulates in the reactor tubes of said at least one reactor for steam reforming at a pressure of between 1 and 5 MPa and at a temperature of between 750 and 1000° C.

27. A process according to claim 26, wherein the feedstock circulates in the reactor tubes of said at least one reactor for converting $CO_2$ at a pressure of between 0.5 and 5 MPa and at a temperature at the outlet of the reactor of between 750 and 1100° C.

28. A process according to claim 17, wherein means for providing a pressurized heat exchange produces a heat exchange gas which contains about at least 15% by volume of oxygen, at a pressure of about 0.3 to 0.5 MPa and a temperature that is higher than 500° C.

* * * * *